March 27, 1934.  G. T. RONK  1,952,894
SUPPLEMENTAL TREAD BELT MECHANISM FOR TRACTORS
Filed Nov. 25, 1930   3 Sheets-Sheet 1

Inventor
George T. Ronk
by Orwig & Hague Att'ys

March 27, 1934.  G. T. RONK  1,952,894
SUPPLEMENTAL TREAD BELT MECHANISM FOR TRACTORS
Filed Nov. 25, 1930   3 Sheets-Sheet 2

Inventor
George T. Ronk
by Orwig & Hague Attys

March 27, 1934.  G. T. RONK  1,952,894
SUPPLEMENTAL TREAD BELT MECHANISM FOR TRACTORS
Filed Nov. 25, 1930  3 Sheets-Sheet 3

Inventor
George T. Ronk
by Craig & Hague Attys

Patented Mar. 27, 1934

1,952,894

UNITED STATES PATENT OFFICE 1,952,894

SUPPLEMENTAL TREAD BELT MECHANISM FOR TRACTORS

George T. Ronk, Cedar Rapids, Iowa, assignor to Speeder Machinery Corporation, Cedar Rapids, Iowa, a corporation of Iowa Application November 25, 1930, Serial No. 498,077

3 Claims. (Cl. 305—8)

In connection with the use of tractors of the tread belt type, the parts are generally so proportioned that the tractor belt shoes, which are in contact with the roadway at any given time, are capable of successful operation and of supporting a load under normal conditions of the road surface. In operating machinery such as excavating machinery on tread belt tractors in swamps or soft soils, the ordinary tread belt will not sustain the load and it becomes necessary to provide supplemental tread belts for substantially decreasing the weight per square inch, as applied to the tread portions in contact with the soil to successfully operate and support the load under such conditions.

Heretofore numerous efforts have been made to provide supplemental tread devices for this purpose, but they have not met with commercial success due to the fact that they are complicated and expensive in construction, or not sufficiently sturdy to withstand the strains and stresses to which they are subjected in actual use.

The object of my invention is to provide a supplemental tread belt apparatus for tread belt tractors of simple, durable and inexpensive construction, and so constructed and arranged that it will successfully withstand the various strains and stresses to which it is subjected in use; and in addition it is my object to provide a structure of this character which may be readily, quickly and easily reconstructed into an ordinary tread belt tractor without the necessity of tearing down or reconstructing or in any way altering the construction of the tractor proper.

My invention consists in the construction, arrangement and combination of the various parts of the device, whereby the objects contemplated are attained, as hereinafter more fully set forth, pointed out in my claims, and illustrated in the accompanying drawings, in which:

Figure 3 shows a vertical, transverse, sectional view through one of the ordinary tread belt devices and my improved supplemental tread belt device at the point where the belt driving axle passes through.

Figure 6 is a transverse sectional view of my tread belt device taken at the point where the shaft for supporting the tread belt supporting the sprockets passed through and at the opposite end of the tread device from that which supports the drive shaft.

Figure 1:
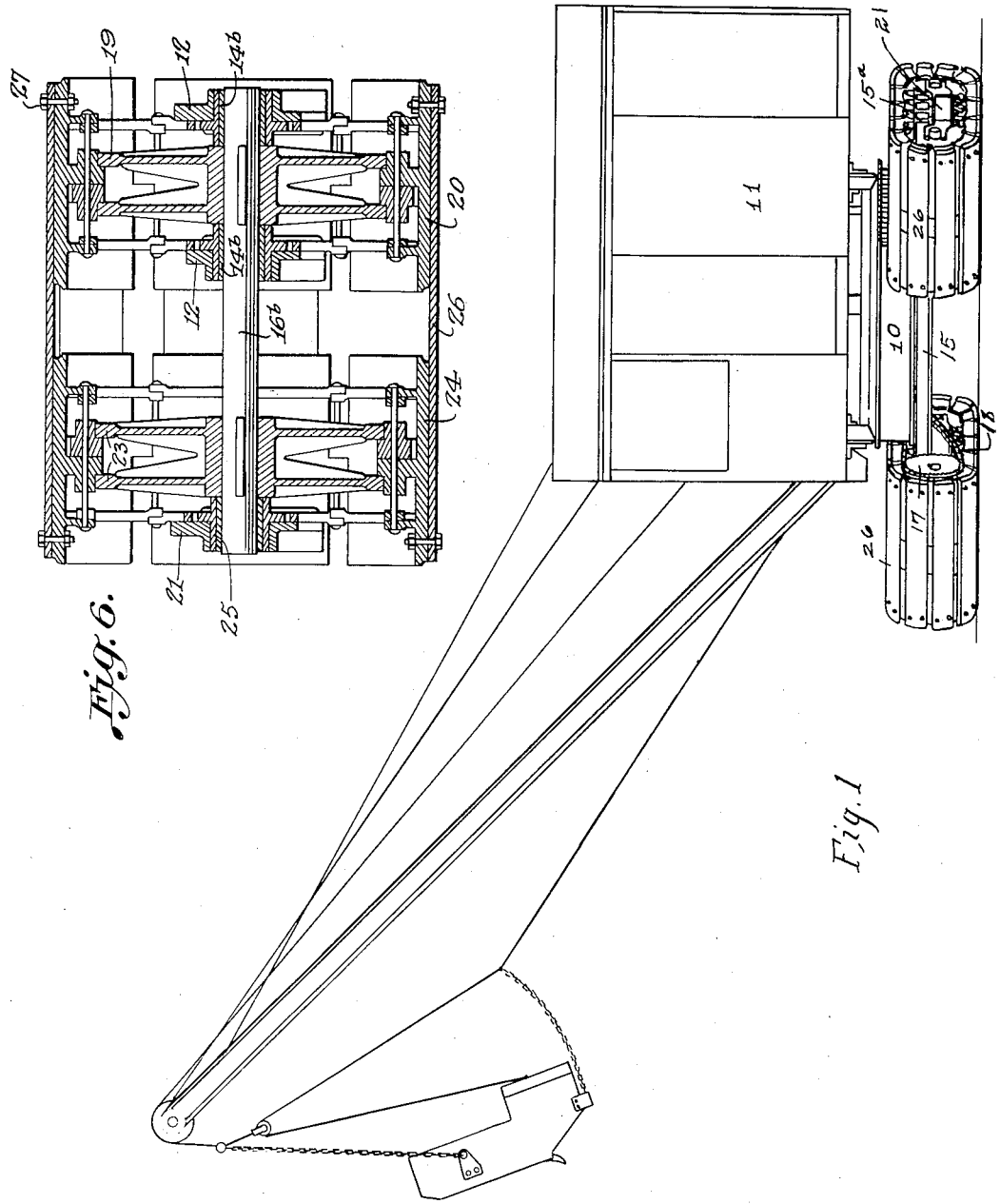
Figure 1 shows a perspective view illustrating a tread belt tractor upon which is mounted an excavating apparatus, and showing my improved supplemental tread belt apparatus applied as in use.

Referring to the accompanying drawings, I have used the reference numeral 10 to indicate generally the main frame of the tractor. Mounted upon this main frame is an excavating apparatus indicated generally by the numeral 11.

Figure 2:
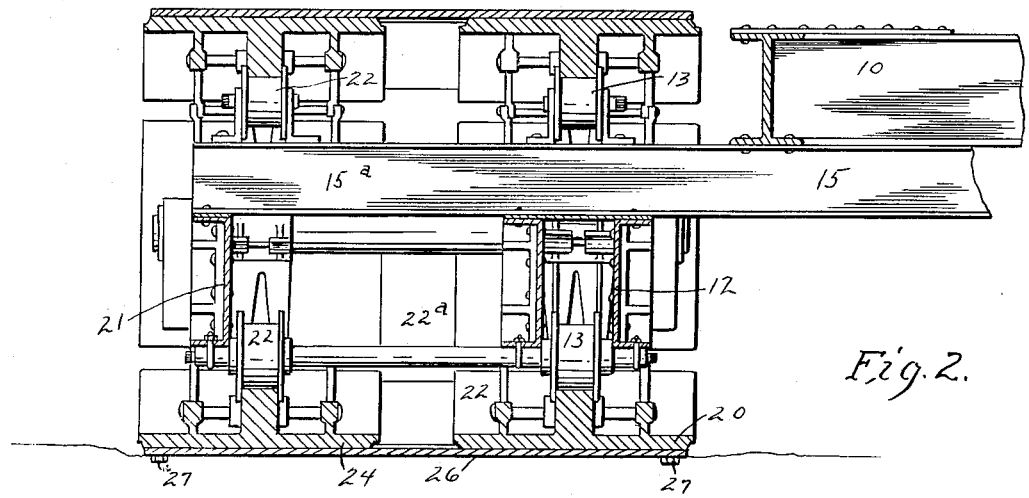
Figure 2 shows a detail, vertical, transverse sectional view through a portion of the main frame, the ordinary tread belt supporting frame, and the supplemental tread belt supporting frame at a point adjacent to one of the transverse sills.

On each side of the main frame there is a traction belt supporting beam 12 having rollers 13 for the traction belt, and bearings 14 for the belt driving axle. A similar set of bearings 14b is provided at the opposite end of said bearing and provided with a shorter shaft 16b. Beam 12 is firmly secured to the transverse sills 15 fixed to the main frame, as shown in Figure 2. This beam 12 is made of two channel bars spaced apart with a plate secured to their upper portions for rigidly connecting them and for preventing the entrance of dust from the top.

Axles 16a and 16b are extended through the bearings 14 and 14b, and one of them is provided with an axle driving sprocket 17 driven by a chain 18 from a suitable source of power on the main frame. The axle 16b is located in a bearing 14b carried by the end of the beam 12 opposite the end in which the axle 16 is mounted. On each of the axles 16 and 16b is a traction belt sprocket 19, and the usual traction belt is mounted upon these sprockets 19 and rollers 13, and each belt comprises a series of tread shoes 20.

My improved supplemental tread belt device comprises a supplemental beam 21. This beam comprises a single channel bar, upon which is mounted traction belt supporting rollers 22, and the traction belt driving sprockets 23, and a traction belt device comprising tread shoes 24 running over said sprockets 23 and rollers 22.

For the purpose of forming an adequate support for the lower rollers 13 and 22, I have provided axles 22a of a length to receive two of said rollers, and these axles are secured by U-bolts 22b to the frames 12 and 21.

Figure 3:
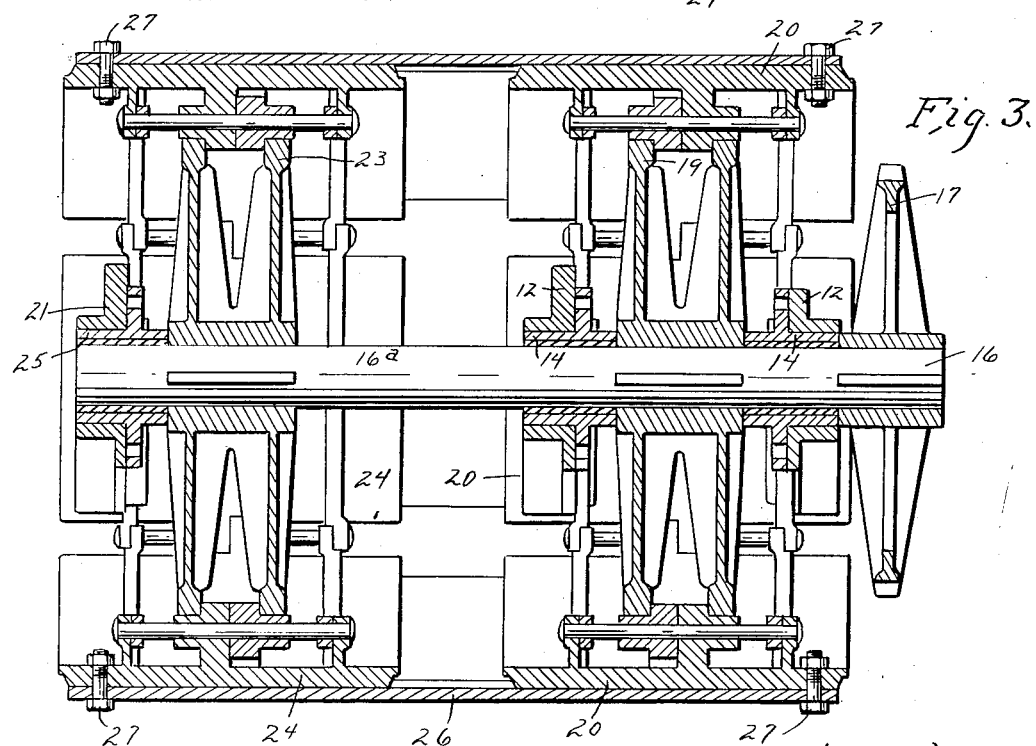

The beams 21 are supported by the outer ends 15a of the sills 15, while the sprockets 23 are supported by the outer ends of the shafts 16 and 16b. Bearings 25 carried by the beam 21 are provided for supporting the outer ends of the shafts 16 and 16b, as illustrated in Figures 3 and 6. The beam 21 is so positioned relative to the frame 12 as to provide a space between the belt shoes 20 and 24, as shown in Figure 3.

For the purpose of giving additional strength and rigidity to the structure, and for providing an improved tread portion for the traction belts, I have provided a series of traction plates 26 of a length to extend from the outer edge of one of the shoes 24 to the inner edge of the adjacent shoe 20, and these traction plates 26 are then detachably secured by bolts 27 to the shoes 24 and 20, as shown in Figure 3. The width of the plates 26 is such that spaces of substantial width are formed between the adjacent side edges thereof, as shown in Figure 1.

This structure by which spaces are provided between the plates 26, and spaces are provided between the adjacent shoes 20 and 24, provides a structure which is self-cleaning. That is to say, when earth or mud enters the interior portions of the traction belts it may pass out through said openings.

Figure 5:
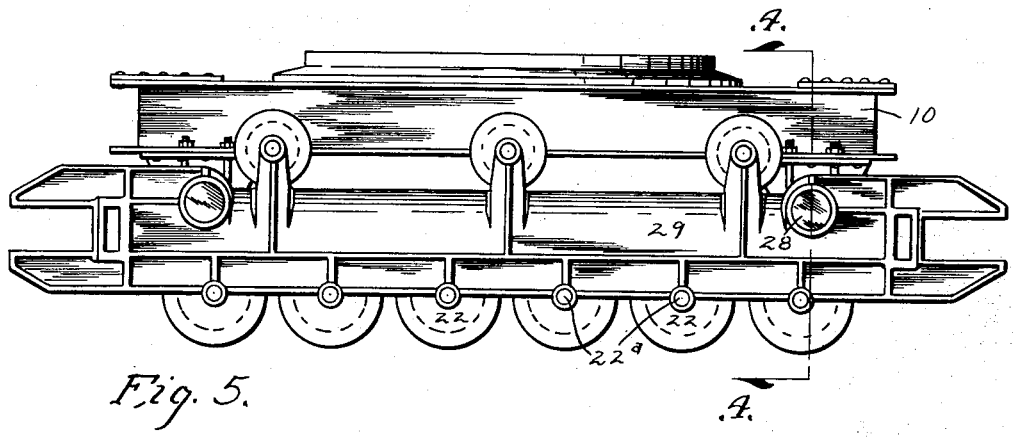
Figure 5 shows a side view of a portion of the main frame and the supplemental tread belt supporting frame illustrating the same modification shown in Figure 4.
Figure 4:
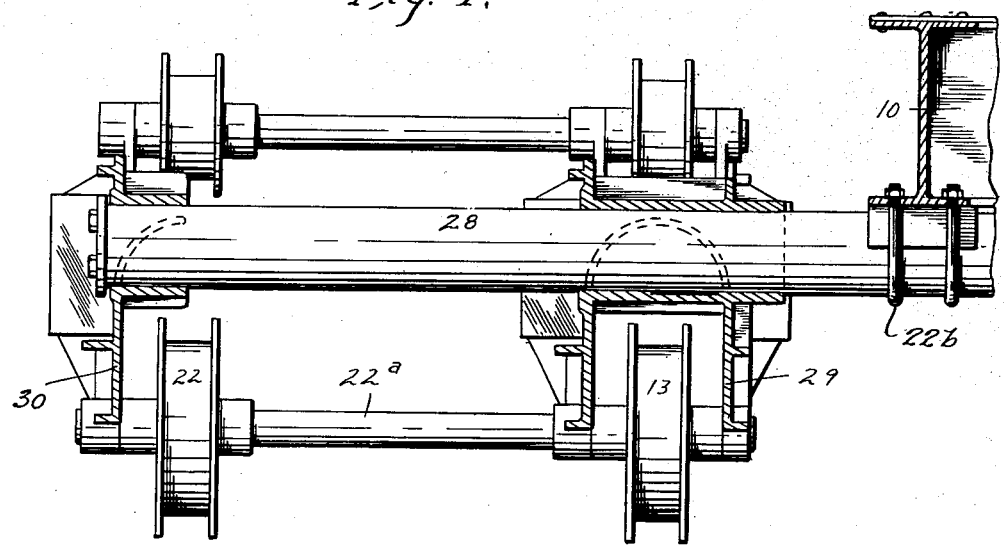
Figure 4 shows a detail vertical transverse sectional view through a portion of the main frame, a tread belt supporting frame and a supplemental tread belt supporting frame, illustrating a modification.

In the modified form illustrated in Figures 4 and 5 the sills 28 are round in cross section and the frame 29 is formed of a single casting formed with openings into which these round sills are fitted. The body of the frame has spaced sides and is open at the bottom to admit the rollers 13 and closed at the top to exclude dust. The supplemental beam 30 is like the beam 29 except that it is shaped like the outer half of the beam 29. Both beams are formed with openings for axles 22a to support the rollers 22.

In practical use with a device embodying the structure herein disclosed, I have demonstrated that it is of very simple and inexpensive construction. The transverse sills 15 are made strong and heavy enough to withstand the strains which might be applied to the supplemental treads, and there is no extra strain applied to the driving sprockets for the axles 16. Hence, the standard mechanism for this purpose may be employed.

By connecting the tread driving sprockets of the supplemental traction device with the main traction device by integral axles, I have provided a structure in which the supplemental traction device is always in proper line with the main driving device, and no complicated mechanism of any kind is required to drive the supplemental traction belts from the power source, and due to the extreme simplicity of my improved device, I have demonstrated in actual tests that the supplemental tread portions are sufficiently strong and durable to successfully withstand the strains and stresses to which such devices are ordinarily subjected.

Another advantage of my improved structure is that after the device has served its purpose with the supplemental tread devices for use in swamps or soft soils, and it should be desired to convert it into a standard tread belt tractor, this may be done very readily and easily by simply cutting off the integral extension ends of the transverse sills 15, the sprocket driving axles 16a and the roller supporting axles 22a, and then removing the tread plates 26, whereupon the entire supplemental traction belt mechanism may be removed and the remainder of the device constitutes a standard tread belt tractor mechanism ready for operation without any change or adjustment being necessary in its mechanism.

I claim as my invention:

1. In a device of the class described, a tractor frame including a main body member, transversely arranged sills, and a pair of spaced tractor belt supporting beams carried by each end of said sills, a pair of sprocket supporting shafts carried by each pair of beams, a tractor belt supporting sprocket mounted on and near each end of each of said shafts resulting in two sets of longitudinally spaced and alined sprockets, means for driving one shaft of each set of shafts, a tractor belt carried by each set of corresponding sprockets, each belt including tread shoes, a series of tread plates carried by the shoes of both tractor belts of each set of tractor belts to form a comparatively wide tread, and means for detachably connecting said tread plates to said shoes whereby a comparatively narrow tread may be obtained by removing said tread plates and outer traction belt, the inner belt and treads being adapted to operate and support the weight of the tractor frame without alteration when the outer tread belt and beam has been removed.

2. In a device of the class described, a tractor frame including a main frame, transversely arranged sills and a pair of spaced tractor belt supporting beams carried by each end of said sills, a tractor belt carried by each of said beams, each of said tractor belts including tread shoes, means for simultaneously driving both tractor belts of each pair of tractor belts, a series of tread plates carried by shoes of both tractor belts of each set of tractor belts to form a comparatively wide tread, and means for detachably connecting said tread plates to said shoes whereby a comparatively narrow tread may be obtained by first removing said tread plates and outer traction belt, the inner belt and treads being adapted to operate and support the weight of the tractor frame without alteration when the outer tread belt and beams have been removed.

3. In a device of the class described, a tractor frame including a main frame and transversely arranged sills, a tractor belt supporting beam carried by each end of said sills, each of said beams having at each end a pair of transversely spaced and alined bearings, an auxiliary beam carried by said sills and spaced outwardly from each of the first said beams, each of the last said beams having an auxiliary bearing in axial alinement with a corresponding pair of bearings, a shaft supported in each pair of said first bearings and the corresponding auxiliary bearing, a sprocket supported by each shaft and between the bearings of each pair of bearings, a tractor belt carried by the corresponding sprockets of each beam, a sprocket carried by each shaft adjacent to each auxiliary bearing, and a tractor belt carried by the last corresponding sprockets.

GEORGE T. RONK.